United States Patent
Procida

(10) Patent No.: US 10,941,621 B2
(45) Date of Patent: Mar. 9, 2021

(54) UNBONDED FLEXIBLE PIPE

(71) Applicant: National Oilwell Varco Denmark I/S, Brondby (DK)

(72) Inventor: Inger-Margrete Procida, Hellerup (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 118 days.

(21) Appl. No.: 16/374,117

(22) Filed: Apr. 3, 2019

(65) Prior Publication Data

US 2019/0309582 A1 Oct. 10, 2019

Related U.S. Application Data

(60) Provisional application No. 62/653,011, filed on Apr. 5, 2018.

(51) Int. Cl.

| | |
|---|---|
| *F16L 11/08* | (2006.01) |
| *E21B 17/20* | (2006.01) |
| *F16L 11/12* | (2006.01) |
| *B32B 15/085* | (2006.01) |
| *B32B 27/20* | (2006.01) |
| *B32B 27/32* | (2006.01) |

(52) U.S. Cl.
CPC ............ *E21B 17/20* (2013.01); *F16L 11/083* (2013.01); *F16L 11/12* (2013.01); *B32B 15/085* (2013.01); *B32B 27/20* (2013.01); *B32B 27/32* (2013.01); *B32B 2264/0207* (2013.01); *B32B 2264/101* (2013.01); *B32B 2307/536* (2013.01); *B32B 2307/72* (2013.01); *B32B 2597/00* (2013.01)

(58) Field of Classification Search
CPC ........ F16L 11/10; F16L 11/083; F16L 11/088; F16L 11/02
USPC .................................. 138/129, 137, 134, 135
See application file for complete search history.

(56) References Cited

U.S. PATENT DOCUMENTS

| | | |
|---|---|---|
| 5,176,179 A | 1/1993 | Bournazel et al. |
| 5,307,842 A | 5/1994 | Lequeux |
| 6,006,788 A * | 12/1999 | Jung .................. F16L 58/02 138/131 |

(Continued)

FOREIGN PATENT DOCUMENTS

| | | |
|---|---|---|
| AU | 2005200068 A | 2/2005 |
| EP | 0 844 429 A1 | 5/1998 |

(Continued)

OTHER PUBLICATIONS

Preliminary French Search Report for application No. FR1903661, dated Feb. 19, 2020.

(Continued)

*Primary Examiner* — Patrick F Brinson
(74) *Attorney, Agent, or Firm* — Pearne & Gordon LLP

(57) ABSTRACT

An unbonded flexible pipe for offshore fluid transportation is disclosed. The pipe includes from inside and outwards a sealing sheath, a pressure armor layer, at least one tensile armor layer, at least one support layer and an extruded external protective polymer sheath. The at least one support layer includes at least one support strip which is helically wound with a winding angle α of at least about 80 degrees to the longitudinal center axis to provide strip windings along the length of the pipe and the at least one support strip includes a thermoplastic vulcanizate (TPV).

21 Claims, 2 Drawing Sheets

(56) References Cited

U.S. PATENT DOCUMENTS

| | | | |
|---|---|---|---|
| 6,110,550 A | | 8/2000 | Jarrin et al. |
| 8,353,316 B2 * | | 1/2013 | Do .................. F16L 11/083 |
| | | | 138/134 |
| 2005/0115623 A1 * | | 6/2005 | Coutarel ............. F16L 11/083 |
| | | | 138/135 |
| 2007/0119512 A1 * | | 5/2007 | Rytter .................. F16L 11/081 |
| | | | 138/126 |
| 2010/0101675 A1 * | | 4/2010 | Do .................. F16L 11/083 |
| | | | 138/130 |
| 2012/0261017 A1 * | | 10/2012 | Christensen ............ B32B 5/142 |
| | | | 138/137 |
| 2014/0076451 A1 | | 3/2014 | Felix-Henry et al. |
| 2015/0059904 A1 * | | 3/2015 | Nokkentved ............ G01M 3/38 |
| | | | 138/104 |
| 2017/0114931 A1 | | 4/2017 | Glejbol |
| 2017/0122467 A1 | | 5/2017 | Demanze |

FOREIGN PATENT DOCUMENTS

| | | |
|---|---|---|
| GB | 2468801 A | 9/2010 |
| WO | 2014/128422 A1 | 8/2014 |
| WO | 2015/139708 A1 | 9/2015 |
| WO | 2016/078666 A1 | 5/2016 |
| WO | 2016/087836 A1 | 6/2016 |

OTHER PUBLICATIONS

United Kingdom Combined Search and Examination Report for GB 1904113.6 dated Sep. 25, 2019.

"Recommended Practice for Flexible Pipe"; ANSI/API Recommended Practice 17B, Fifth Edition, May 2014, pp. 1-140.

"Specification for Unbonded Flexible Pipe"; ANSI/API Specification 17J, Fourth Edition, May 2014, pp. 1-100.

* cited by examiner

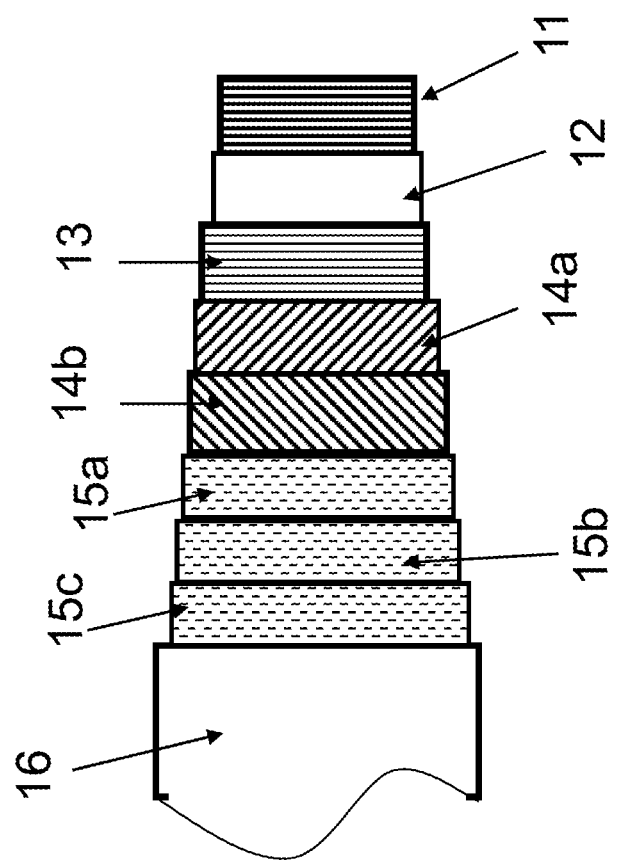

UNBONDED FLEXIBLE PIPE

CROSS-REFERENCE TO RELATED APPLICATIONS

This application claims the benefit of U.S. Provisional Application No. 62/653,011, filed Apr. 5, 2018, the entire disclosure of which is hereby incorporated herein by reference.

TECHNICAL FIELD

The present invention relates to an unbonded flexible pipe suitable for offshore fluid transportation, such as for transport of petrochemical fluids e.g. oil or gas or in a sub-sea environment.

Flexible pipes for offshore applications are generally known from the standard "Recommended Practice for Flexible Pipe", ANSI/API 17 B, fifth Edition, May 2014 (hereafter API17B), and the standard "Specification for Unbonded Flexible Pipe", ANSI/API 17J, Fourth edition, May 2014 (hereafter API17J).

Such pipes are generally referred to as bonded pipes or unbonded pipes. A bonded pipe generally is a pipe in which the steel reinforcement is integrated and bonded to a vulcanized elastomeric material. An unbonded pipe generally is a pipe comprising separate layers, including armor layer(s) and polymeric layer(s), which allows relative movement between layers. The present invention generally concerns unbonded flexible pipes.

Such an unbonded flexible pipe may comprise a number of independent layers, such as helical wound armor layers and polymeric layers, as well as extruded polymeric layers formed around a central bore. A typical steel armored flexible pipe comprises from the inside and outwards an inner armor layer known as the carcass, an internal pressure sheath surrounded by one or more armor layers. The armor layers normally includes a pressure armor and tensile armor. The unbonded flexible pipe further comprises an outer sheath (also referred to as external protective polymer sheath), such as an extruded polymer layer.

The carcass is not fluid tight and thus, the internal pressure sheath, usually an extruded polymer layer, forms a bore in which the fluid to be transported is conveyed and thereby ensures internal fluid integrity and stability. In some unbonded flexible pipes, the carcass may be omitted.

The armor layers surrounding the internal pressure sheath may for example comprise one or more pressure armor layers comprising one or more armor profiles or strips, which are wound around the internal pressure sheath at a large angle (short pitch), e.g. larger than 80°, relative to the center axis of the pipe. This or these pressure armor layers primarily compensate for radial forces in the pipe. The armor layers surrounding the internal pressure sheath may also usually comprise one or more tensile armor layers which are wound at a relative small angle (large pitch), such as between 10° and 50°, relative to the center axis of the pipe. This or these tensile armor layers primarily compensate for axial forces in the pipe. The armor layers are typically made of steel.

In general, flexible pipes are expected to have a lifetime of about 20 years in operation.

Unbonded flexible pipes are e.g. used for the transport of fluids, such as oil and gas between offshore installations, e.g. at large or intermediate sea depths. The fluid may be a hydrocarbon fluid, such as gas, oil, water, $CO_2$ or a mixture hereof depending upon the nature of the hydrocarbon reservoir. The fluid may also be an injection fluid such as water, $CO_2$ or methanol.

During handling of unbonded flexible pipes, the pipe will usually be subjected to high axial forces. For example during installation, the flexible pipe may be subjected to very high tensile axial forces due to the weight of the suspended pipe. For example, installation of long lengths of pipe at sea e.g. as flow line pipes or risers, results in a very high weight of the suspended pipe causing extremely high tensile forces in the uppermost portion of the pipe that is about to be laid out.

To counter these tensile forces, pipe laying systems comprise caterpillars (tensioners) working with opposed gripping shoes arranged for squeezing and holding the unbonded flexible pipe over a certain length of the pipe. During installation, the squeezing between the shoes, which generates a high frictional force between the shoes and the pipe. Often a very high squeezing pressure is required to counter the tensile forces and control the movements of the pipe during the installation. The required squeezing pressure may approach the crush capacity of the pipe to ensure that the movement of the pipe is fully controlled by the caterpillar.

Although the caterpillar works on the outer pipe surface, this surface do not have any inherent load-bearing capacity and the tensile force has therefore to be transferred through multiple polymer layers before reaching the tensile armor of the pipe. Thus, in order for the caterpillar to successfully transfer its force into the tensile armor of the pipe the friction has to be above a certain threshold, both between the shoes of the caterpillar and the pipe surface and between all internal pipe layers separating the tensile armor of the pipe from the pipe surface.

Very often, the coefficient of friction between the external sheath and the outermost tensile armor wires or any layers in-between can be very low. To achieve sufficient frictional force between the layers there is thus a need for a high compression force by the caterpillar thereby increasing the risk of damaging the external sheath and/or increasing the risk of deforming the pipe e.g. by ovalisation of the inner pipe structure. If the inner pipe structure is ovalized the pipe will lose its deep-water crushing capacity and will be considered lost.

WO2014/128422 describes a flexible pipe where a nonwoven material based on fibers are at least partially embedded inside the polymer of the external sealing sheath, thereby increasing the strength of the outer sheath and optionally increasing the friction between the outer sheath and the next layer in the pipe structure.

DISCLOSURE OF INVENTION

An objective of the invention is to provide an unbonded flexible pipe, which at least partly alleviate the above-discussed problem.

In an embodiment it is an objective of the invention is to provide an unbonded flexible pipe, which is suitable for use at very deep waters e.g. below 1500 m, such as below 2500 m and which can be laid out with low risk of damaging the pipe.

In an embodiment, it is an object to provide an unbonded flexible pipe, which can be installed as a flow line pipe and/or as a riser pipes at relative deep water e.g. below 2000 m and where the risk of damaging the pipe during lay out armor corrosion is very low.

These and other objects have been solved by the invention as defined in the claims and as described herein below.

Thus, according to the invention an unbonded flexible pipe for offshore fluid transportation, which at least partly alleviate the above-discussed problem, has been provided. The pipe has a length and a longitudinal center axis and it comprises from inside and outwards a sealing sheath defining a bore for transportation of the fluid, a pressure armor layer comprising at least one armor wire helically wound with a short pitch, at least one tensile armor layer comprising a plurality of armor wires helically wound with a long pitch and an extruded external protective polymer sheath. The pipe in addition comprises at least one support layer comprising at least one support strip located between an outermost of the at least one tensile armor layer. The at least one support strip of each of the at least one support layer has a length and is helically wound with a winding angle α of at least about 80 degrees to the longitudinal center axis to provide strip windings along the length of the pipe and the at least one support strip comprises a thermoplastic vulcanizate (TPV).

It has surprisingly been found that the unbonded flexible pipe of the invention requires less caterpillar squeezing force to transfer frictional forces from the caterpillar to the outermost tensile armor layer, thus making the pipe more resistant towards damage during lay out. Furthermore, tests indicate that the pipe according to the invention is more tolerant against ovalization. It has been found that the TPV material ensures a good distribution of the forces thereby protecting the inner pipe sections, while simultaneously ensuring a transfer of frictional forces from the caterpillar to the outermost tensile armor layer.

Overall, it has been found that the unbonded flexible pipe of the invention has a relatively high reliable internal friction, which results in a low risk of slip between internal layers. Thus, both reduction of the required squeezing pressure applied during installation and the better force distribution reduces the risk of damaging of the pipe during installation.

Unless otherwise specified or clear from the context, the term "substantially" means that ordinary measurement uncertainties, or product variances and tolerances, whichever are larger, are comprised.

The phrase "essentially equal" should herein be taken to mean that variations within measurement tolerances are included.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

Throughout the description or claims, the singular encompasses the plural unless otherwise specified or required by the context.

All features of the invention and embodiments of the invention as described herein, including ranges and preferred ranges, may be combined in various ways within the scope of the invention, unless there are specific reasons not to combine such features.

The phrases "long pitch" and "short pitch" are relative terms i.e. the short pitch is shorter than the long pitch. A winding with an angle of about 75 degrees or larger relative to the pipe axis is generally considered to be a short pitch and a winding with an angle of about 55 degrees or shorter is generally considered to be a long pitch.

The term "axial distance" is used herein to mean the perpendicular distance to the axis of the pipe when the pipe is substantially straight.

The terms "inside" and "outside" a layer of the pipe are used to designate the relative axial distance, such that inside a layer means the area encircled by the layer i.e. with a shorter axial distance than the layer, and "outside a layer" means the area not encircled by the layer and not contained by the layer, i.e. with a longer axial distance than the layer.

The term "inner side" of a layer is the side of the layer facing the axis of the pipe.

The term "outer side" of a layer is the side of the layer facing away from the axis of the pipe.

The term "cross-wound layers" means that the layers comprises wound elongate elements that are wound in opposite direction relatively to the longitudinal axis of the pipe where the angle to the longitudinal axis can be equal or different from each other.

The term 'seabed' is generally used to denote the subsea floor.

The term "downwards" means in a direction from the sea surface towards the seabed.

The phrase "winding angle" means a winding angle relative to the longitudinal center axis (or merely called axis) when the pipe is in straight and unloaded condition.

A support layer may be provided by a single support strip or it may comprise more than one support strip. To ensure a short winding pitch it is desired to provide the support layer from four or less support strips, such as two or less support strips depending on the strip width and the pipe diameter.

The support strip should advantageously not be too thick and it has been found that a thickness up to about 2 cm is suitable. In an embodiment, the support strip has a thickness from about 3 mm to about 2 cm, such as from about 4 mm to about 1.2 cm, such as from 0.5-1 cm.

The maximal width of the support strip may be determined in dependence of the desired winding pitch and the radial location of the support layer relative to the pipe axis. Generally, it is desired that the support strip has a width, which is larger than its thickness, preferably from about 1 cm to about 20 cm, such as from about 2 cm to about 10 cm, such as from about 4 cm to about 6 cm.

Advantageously the support strip(s) is wound with a winding angle α of from about 85 to about 89 degrees. The short pitch winding ensures that even where there are several support layers, these layer does not increase the bending stiffness of the pipe beyond acceptable limits.

Thus, even with several support layers a high and desired flexibility of the pipe may be maintained compared to a prior art pipe without the support layers.

For maintaining high flexibility, it may be desired to have two or more support layers of thinner support strip(s), rather than one single layer of a thicker support strip.

In an embodiment, the support strip of at least one support layer is wound with a winding direction, which is opposite to a winding direction of the armor wires of the outermost tensile layer. Thereby the support layer may act as a retaining (anti-bird-cage) layer preventing the armor wires of the tensile layers from buckling. The support strip(s) may advantageously be pre-stretched prior to or during application onto the tensile armor layer.

In an embodiment, the support strip of a support layer is wound with overlapping windings. Advantageously the support strip of each support layer is wound with non-overlapping windings.

In an embodiment the strip(s) of each support layer is wound with a gap between adjacent windings. The gap may form a clearance, which separates adjacent windings. The average gap is preferably up to about 20% of the width of the support strip(s), preferably about 10% or less of the width of the support strip(s), such as up to about 5% of the width of the support strip(s).

It has been found that even where the strip(s) of each support layer is wound with a very narrow gap between adjacent windings or even no gap between adjacent windings the pipe restore a very high flexibility. Thus, in an embodiment the strip(s) of each support layer is wound with a gap between adjacent windings of about 3% or less, such as about 2% or less of the width of the support strip(s). In an embodiment the strip(s) of each support layer is wound with a gap between adjacent windings of about 2 cm % or less, such as about 1 cm, such as about 0.5 cm or less, such as about 0.3 cm or less or practically without gap.

Advantageously the pipe comprises two or more support layers, such as at least 3 support layers, such as up to 10 support layers, such as up to 6 support layers.

It has been found that the pipe with several support layers ensures a surprisingly high distribution of the compression forces, which may ensure an even further protection against risk of ovalisation due to the compression forces. In particularly where the support strip of each of the support layers is wound with a gap between windings, the transfer of frictional forces from the caterpillar to the outermost tensile armor layer has been found to be very effective.

The plurality of support layers may be wound with same winding direction or they may be cross-wound, preferably cross-wound with substantially identical winding angle to the pipe axis. In an embodiment where the pipe comprises 4 or more support layers it is desired that at least one of the layers is wound with a winding direction opposite to at least one other of the support layers.

Thereby the support layers form a very dimensionally stable support between the external sheath and the outermost tensile armor layer to provide an even better transfer of the gripping forces applied to the external sheath to the outermost tensile armor and at the same time the layered structure of the support layers ensures a good distribution of the applied forces to further reduce the risk of ovalisation.

In an embodiment, the support strips of at least two of the respective support layer have same winding direction, more preferably the support strip(s) of 3 or more, such as of all of the respective support layer have substantially same winding angle $\alpha$.

In an embodiment, the strip(s) of an overlying support layer outside an underlying support layer is wound with same winding direction and substantially same winding angle $\alpha$ as the underlying layer. Preferably the windings of the overlying layer are offset relative to windings of the underlying layer, preferably such that the windings of the overlying support layer covers gaps between windings of the underlying layer.

It has been found that the support layers provide a good thermal insulation, in particularly where the pipe comprises two or more support layers. In addition, the flexibility of the pipe is almost preserved by providing the layers with substantially same winding angle.

The support layers may provide a support structure between the external sheath and the outermost tensile layer, preferably such that the support structure has a packing factor determined while the pipe is in straight and unloaded condition, wherein the packing factor is from 90 to 98% such as at least about 95%.

The packing factor is the percentage of the space between an inner circumference of an innermost of the support layer and an outer circumference of an outermost of the support layer, which is filled with support strips.

To ensure a desirably and effective transfer of frictional forces from the caterpillar to the outermost tensile armor layer and to reduce risk of ovalization it has been found desirably that the support strip mainly consist of TPV. Thus, in an embodiment the support strip comprises at least about 80% by weight of TPV, such as at least 90% by weight of TPV. In an embodiment the support strip on a weight basis essentially consist of a thermoplastic vulcanizate (TPV) and optionally up to about 8% by weight, such as up to about 3% by weight of fillers and/or stabilizers, and/or processing oils (plasticizers), preferably the support strip is essentially free of processing oils.

In an embodiment the wherein the at least one support strip comprises up to about 10% by volume of glass beads, preferably hollow glass beads.

It has been found that the risk of collapse or crushing of the glass beads are very low even when applied at deep water where the support layer(s) may be subjected to very high hydrostatic pressure. It is believed that the elasticity and at the same time stable character of the TPV adds to protecting the glass beads. The TPV generally comprises a continuous polymer matrix filled with domains of rubber thereby providing the material with a mixed hard/soft character, which has shown to provide the good support for the glass beads.

In an embodiment, wherein the TPV of the support strip(s) comprises up to about 8% by weight of inorganic fillers, preferably selected from, nanotubes, silicates, glass beads, fibers or any mixture hereof.

Advantageously the TPV comprises a thermoplastic polymer matrix and a vulcanized rubber phase dispersed throughout the thermoplastic matrix, preferably, the rubber is vulcanized to a degree of from about 90% to about 98%.

The thermoplastic polymer may preferably be a polyolefin, preferably a polypropylene (PP), a polyethylene (PE) or a combination comprising at least one of PP or PE.

The rubber may advantageously be ethylene propylene dien monomer rubber (EDPM), polybutadiene rubber, polyisoprene rubber, polyethylene-butylene rubber or any combination comprising at least one of the mentioned rubbers.

The TPV of the support strip(s) advantageously comprises from about 20 to about 50% by volume of thermoplastic polymer, such as from about 30 to about 40% by volume of thermoplastic polymer. The amount of vulcanized rubber may advantageously be from about 50 to about 80% by volume, such as from about 60 to about 70% by volume of vulcanized rubber.

The TPV of the support strip(s) may advantageously have a density of from about 0.89 to about 0.98, such as from about 0.93 to about 0.95 and a shore A hardness of about 98 or less, such as from about 90 to about 95.

It is preferred that the TPV support strip is a single layered strip, however in an embodiment it may comprise two or more layers, including at least one TPV layer, preferably including wo or more TPV layers, such as an uppermost and a lowermost TPV layer, for example with an intermediate thermoplastic layer e.g. of PP and/or PE.

The external protective polymer sheath may for example be of polyamide, polypropylene or polyethylene, such as cross-linked polyethylene.

It has been found to be very advantageous that the external protective polymer sheath is of TPV. Thereby the transfer of frictional forces from the caterpillar to the outermost tensile armor layer may be even more effective.

In an embodiment, the external protective polymer sheath is fluid impermeable and protects the support layer(s) and armor layers from contact with seawater.

In another embodiment the external protective polymer sheath is water permeable, for example the external protective polymer sheath may comprise perforations.

The unbonded flexible pipe may comprise one or more additional layers such as retaining layer(s), intermediate layer(s), carcass and/or further armor layers. For example, the unbonded flexible pipe may comprise additional layers as described in the standards API17J or API17B.

In an embodiment, the unbonded flexible pipe comprises a composite layer between the support layer(s) and the outermost tensile armor, the composite layer preferably comprises a wound retaining layer of a fiber-reinforced tape. This retaining layer advantageously is located directly onto the outermost tensile armor layer and the at least one, preferably at least two support layers are arranged onto the retaining layer.

All features of the inventions and embodiments of the invention as described herein including ranges and preferred ranges may be combined in various ways within the scope of the invention, unless there are specific reasons not to combine such features.

BRIEF DESCRIPTION OF PREFERRED EMBODIMENTS AND ELEMENTS OF THE INVENTION

The above and/or additional objects, features and advantages of the present invention will be further elucidated by the following illustrative and non-limiting examples and description of embodiments of the present invention, with reference to the appended drawings.

The figures are schematic, are not drawn to scale, and may be simplified for clarity. Throughout, the same reference numerals are used for identical or corresponding parts.

FIG. 1b is a cross-sectional view of the pipe of FIG. 1a.

FIG. 2 is a schematic side view of an embodiment of another unbonded flexible pipe of the invention.

Figure 1B:
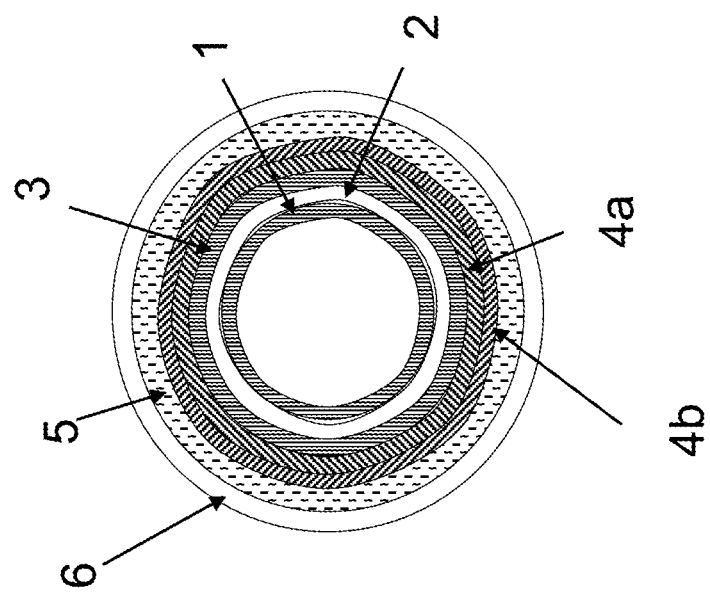
Figure 1A:
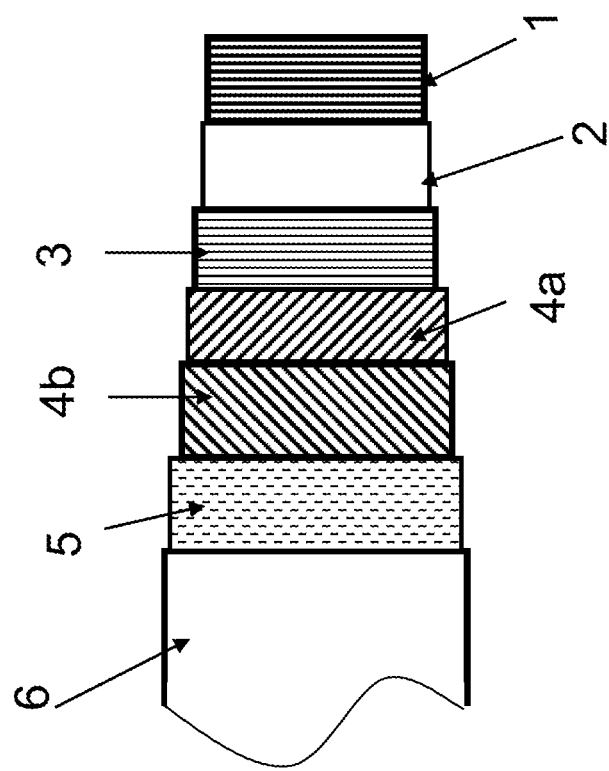
FIG. 1a is a schematic side view of an embodiment of an unbonded flexible pipe of the invention.

FIGS. 1a and 1b show an unbonded flexible pipe comprising from inside and out a carcass 1, a sealing sheath 2, a pressure armor layer 3, 2 cross-wound tensile armor layers 4a, 4b a support layer 5 and an external protective polymer sheath 6. In this embodiment the pipe comprise one single support layer 5.

The carcass layer comprises an interlocked metallic construction that has the purpose of preventing collapse of the sealing sheath or pipe. The sealing sheath is an extruded polymer layer polymer layer that ensures internal-fluid integrity. The pressure armor layer is a structural layer, preferably of wound interlocked armor wires with a lay angle close to 90°. The pressure armor layer increases the resistance of the flexible pipe to internal and external pressure and mechanical crushing loads; structurally supports the internal-pressure sheath; and typically consists of an interlocked metallic construction, which may be backed up by a flat metallic spiral layer. The tensile armor layers are advantageously structural layers of helically wound metal wires with a lay angle typically between 20° and 55°, The tensile armor layers 4a, 4b are cross wound with substantially same or identical angle to the pipe axis.

The external protective polymer sheath may be permeable or impermeable to seawater. The main purpose of the external protective polymer sheath is to provide a mechanical protection of the underlying layers. In an embodiment, the external protective polymer sheath is an outer sheath of an extruded polymer layer used to protect the pipe against penetration of seawater and other external environments abrasion and mechanical damage, and to keep the tensile armor wires in position after forming. Anti-wear layers may advantageously be located between the armor layers to minimize wear between there structural layers. The anti-wear layers may be non-metallic layer, either extruded thermoplastic sheath or tape wrapping.

The support layer may be produced according to the following example:

Example

Extrusion of a standard 50×10 mm flat tape for a support strip is performed on a conventional single screw extruder with a 90 mm screw diameter and an L/D ratio of 30.

The temperature setting on the heating zone of the extruder ranges from 160 to 185° C. and with a head temperature 190° C. the typically melt temperature outside the extruder will be 190-195° C.

The extruded material grade is TPV grade 8201-90 from Exxon Mobile delivered as pellets and predried for 2 hours at 80° C. before extrusion.

After extrusion through a flat die, the tape is first cooled in air and later in a cooling bath with temperature gradient to secure sufficient cooling of the tape.

To secure stable properties in the tape, the surface temperature of the tape is cooled to 45° C. or less before winding.

The tape is wound with a winding degree of about 85 degrees and with a gap between winding of about 4 mm onto the outermost tensile armor layer 4b to provide the support layer 5.

FIG. 2 is another embodiment of an unbonded flexible pipe of the invention.

The pipe comprises from inside and out a carcass 11, a sealing sheath 12, a pressure armor layer 13, 2 cross-wound tensile armor layers 14a, 14b, several support layers 5a, 5b, 5c and an external protective polymer sheath 6. In this embodiment, the pipe comprises several support layers, here illustrated with 3 layers 5a, 5b, 5c.

The 3 support layers 5a, 5b, 5c may be of the same or of different TPV materials. For example each of the 3 support layers 5a, 5b may be produced by helically winding of a strip according to the above example.

The invention claimed is:

1. An unbonded flexible pipe for offshore fluid transportation, the pipe has a length and a longitudinal center axis, the pipe comprising a sealing sheath defining a bore for transportation of the fluid, a pressure armor layer comprising at least one armor wire helically wound with a short pitch, at least one tensile armor layer comprising a plurality of armor wires helically wound with a long pitch and an extruded external protective polymer sheath, wherein the pipe comprises at least one support layer comprising at least one support strip arranged between an outermost of the at least one tensile armor layer and the external protective polymer sheath, wherein the at least one support strip of each of the at least one support layer has a length and is helically wound with a winding angle $\alpha$ of at least about 80 degrees to the longitudinal center axis to provide strip windings along the length of the pipe and wherein the at least one support strip comprises a thermoplastic vulcanizate (TPV), wherein the TPV comprises a thermoplastic polymer matrix and a vulcanized rubber phase dispersed throughout the thermoplastic polymer matrix.

2. The unbonded flexible pipe of claim 1, wherein the support strip(s) has a thickness from about 3 mm to about 2 cm.

3. The unbonded flexible pipe of claim 1, wherein the support strip(s) has a width, which is larger than its thickness.

4. The unbonded flexible pipe of claim 1, wherein the support strip(s) is wound with a winding angle α of from about 85 to about 89 degrees.

5. An unbonded flexible pipe for offshore fluid transportation, the pipe has a length and a longitudinal center axis, the pipe comprising a sealing sheath defining a bore for transportation of the fluid, a pressure armor layer comprising at least one armor wire helically wound with a short pitch, at least one tensile armor layer comprising a plurality of armor wires helically wound with a long pitch and an extruded external protective polymer sheath, wherein the pipe comprises at least one support layer comprising at least one support strip arranged between an outermost of the at least one tensile armor layer and the external protective polymer sheath, wherein the at least one support strip of each of the at least one support layer has a length and is helically wound with a winding angle α of at least about 80 degrees to the longitudinal center axis to provide strip windings along the length of the pipe and wherein the at least one support strip comprises a thermoplastic vulcanizate (TPV), wherein the support strip(s) of the at least one support layer is wound with a winding direction which is opposite to a winding direction of the armor wires of the outermost tensile layer.

6. The unbonded flexible pipe of claim 1, wherein the support strip(s) of one or more of the at least one support layer is/are wound with non-overlapping windings.

7. The unbonded flexible pipe of claim 1, wherein the support strip(s) of each of the at least one support layer is wound with a gap between adjacent windings, the average gap is from about 2% to about 20% of the width of the support strip(s).

8. The unbonded flexible pipe of claim 1, wherein the pipe comprises two or more support layers.

9. The unbonded flexible pipe of claim 1, wherein the strip(s) of an overlying support layer outside a underlying support layer is wound with same winding direction and substantially same winding angle α as the underlying layer, wherein the windings of the overlying layer is offset relative to windings of the underlying layer such that the windings of the overlying support layer covers gaps between windings of the underlying layer.

10. The unbonded flexible pipe of claim 8, wherein the support layers provides a support structure between the external sheath and the outermost tensile layer, wherein the support structure has a packing factor determined while the pipe is in straight and unloaded condition, wherein the packing factor is from 90 to 98%.

11. The unbonded flexible pipe of claim 1, wherein the at least one support strip on a weight basis essentially consists of a thermoplastic vulcanizate (TPV) including up to about 8% by weight of fillers, stabilizers and/or processing oils (plasticizers).

12. The unbonded flexible pipe of claim 1, wherein the at least one support strip comprises up to about 10% by volume of glass beads.

13. The unbonded flexible pipe of claim 1, wherein the thermoplastic polymer matrix comprises a polyolefin selected from polypropylene (PP), polyethylene (PE) or a combination comprising at least one of PP or PE.

14. The unbonded flexible pipe of claim 1, wherein the vulcanized rubber phase comprises at least one of ethylene propylene dien monomer rubber (EDPM), polybutadiene rubber, polyisoprene rubber, polyethylene-butylene rubber or any combination comprising at least one of the mentioned rubbers.

15. The unbonded flexible pipe of claim 1, wherein the TPV of the support strip(s) comprises from about 20 to about 50% by volume of the thermoplastic polymer matrix and from about 50 to about 80% by volume of the vulcanized rubber phase.

16. The unbonded flexible pipe of claim 1, wherein the TPV of the support strip(s) comprises up to about 8% by weight of inorganic fillers.

17. The unbonded flexible pipe of claim 1, wherein the TPV of the support strip(s) has a density of from about 0.89 to about 0.98.

18. The unbonded flexible pipe of claim 1, wherein the support strip(s) has a shore A hardness of about 98 or less.

19. The unbonded flexible pipe of claim 1, wherein the at least one support strip is a layered strip, comprising two or more layers, including at least one TPV layer.

20. An unbonded flexible pipe for offshore fluid transportation, the pipe has a length and a longitudinal center axis, the pipe comprising a sealing sheath defining a bore for transportation of the fluid, a pressure armor layer comprising at least one armor wire helically wound with a short pitch, at least one tensile armor layer comprising a plurality of armor wires helically wound with a long pitch and an extruded external protective polymer sheath, wherein the pipe comprises at least one support layer comprising at least one support strip arranged between an outermost of the at least one tensile armor layer and the external protective polymer sheath, wherein the at least one support strip of each of the at least one support layer has a length and is helically wound with a winding angle α of at least about 80 degrees to the longitudinal center axis to provide strip windings along the length of the pipe and wherein the at least one support strip comprises a thermoplastic vulcanizate (TPV), wherein the external protective polymer sheath comprises a layer of TPV.

21. The unbonded flexible pipe of claim 1, wherein the unbonded flexible pipe comprises a composite layer between the support layer(s) and the outermost tensile armor, the composite layer comprises a wound retaining layer of a fiber-reinforced tape.

* * * * *